United States Patent [19]
Dernier

[11] Patent Number: 5,767,783
[45] Date of Patent: Jun. 16, 1998

[54] SIGNALLING DEVICE VISIBLE THROUGHOUT 360° COMPRISING A LIGHT SOURCE COMPOSED OF SEVERAL ELECTROLUMINESCENT DIODES AND SEA BUOY PROVIDED WITH SAID DEVICE

[76] Inventor: Henri Dernier, 38 Quai des Americains, 59140 Dunkerque, France

[21] Appl. No.: 666,438

[22] PCT Filed: Dec. 20, 1994

[86] PCT No.: PCT/FR94/01495
§ 371 Date: Oct. 10, 1996
§ 102(e) Date: Oct. 10, 1996

[87] PCT Pub. No.: WO95/18331
PCT Pub. Date: Jul. 6, 1995

[30] Foreign Application Priority Data

Dec. 28, 1993 [FR] France ..................... 93 15997

[51] Int. Cl.$^6$ ..................................... G08B 5/00
[52] U.S. Cl. ................ 340/815.4; 340/984; 313/500; 362/800
[58] Field of Search ............... 340/984, 473, 340/815.4, 332, 815.45, 815.83, 815.86, 981, 982, 983; 362/184, 800; 116/26, 107; 313/500, 505

[56] References Cited

U.S. PATENT DOCUMENTS

| | | | |
|---|---|---|---|
| 4,271,408 | 6/1981 | Teshima et al. | 340/815.45 |
| 4,298,869 | 11/1981 | Okuno | 340/815.45 |
| 4,445,132 | 4/1984 | Ichikawa et al. | 340/815.45 |
| 4,464,129 | 8/1984 | Vancheri et al. | 340/984 |
| 5,152,601 | 10/1992 | Ferng | 362/183 |
| 5,387,838 | 2/1995 | Hirakawa et la. | 313/500 |
| 5,585,783 | 12/1996 | Hall | 340/985 |

FOREIGN PATENT DOCUMENTS 2631102  11/1989  France.

*Primary Examiner*—Brent A. Swarthout
*Attorney, Agent, or Firm*—Kerkam, Stowell, Kondracki & Clarke, P.C.; John C. Kerins

[57] ABSTRACT

Signalling device visible throughout 360° comprising a secondary power circuit having, for each diode, a connection area (9), wherein the diodes are located at right angles to said areas. The device is characterized in that the areas (9) for connecting each group of diodes connected electrically in series are, firstly, offset from one another by a reference distance (D), and, secondly, aligned along an axis, known as a series supply line. The device is also characterized in that within a series of series supply lines, the areas (9) for connecting a line are, in relation to the immediately adjacent lines of the same series, offset by a value substantially equal to the ratio of the reference distance divided by the number of lines in the series.

8 Claims, 2 Drawing Sheets

1
SIGNALLING DEVICE VISIBLE THROUGHOUT 360° COMPRISING A LIGHT SOURCE COMPOSED OF SEVERAL ELECTROLUMINESCENT DIODES AND SEA BUOY PROVIDED WITH SAID DEVICE

BACKGROUND OF THE INVENTION

The invention relates to a signalling device visible from 360° comprising a light source composed of several electroluminescent diodes.

It also relates to a sea buoy equipped with the device.

It applies more particularly, though not exclusively, to the nautical field in which it is necessary to indicate, by means of a coded light signal, certain positions referred to on maps.

A light device, also called a light beacon, which emits a light signal, is used for this purpose.

This signal could be continuous but it is generally composed of a series of light flashes.

This basic signal can be obtained by baffling a light source, for example by means of a shutter, but more generally the various light flashes are created by controlling the light source.

While in urban areas the supply of electrical power and the maintenance of the signalling device are relatively simple to achieve, this is not the case when these light beacons are located in difficult-to-reach areas and, for example, when these beacons are placed at sea on buoys.

Also, it is preferable to limit servicing of the signalling device as much as possible, which is why a reliable device is required.

In the majority of the known embodiments, the light source is an incandescent lamp which must be periodically changed at intervals that essentially depend on the quality of the lamp but which are nevertheless frequent.

In other applications, it is known (DE-A-3.806.217) to replace these incandescent lamps with electroluminescent diodes which have a service life far longer than that of the incandescent lamps known to date.

Instead of using a single electroluminescent diode placed at the center of a costly optical device, it is preferable for this light source to be constituted by a plurality of diodes supported in a particular disposition on a rotating cylindrical support.

In this known embodiment, the number of diodes is limited, which allows them to be supplied with power individually by means of standard cable wiring.

However, the small number of diodes reduces the visibility of the beacon.

For this reason, it is preferable to increase the diode density of the signalling device even if, because of this, it becomes much more difficult to supply power to each diode individually with standard electrical cables since the wiring would take up a lot of space and reliability would be reduced.

Another problem raised by the utilization of these diodes is that, because of the available electrical voltage, for example from 9 to 15 volts, and the individual supply voltage of the diodes which is between 1.5 and 3 volts, it is only possible to supply power to groups of diodes connected in series (FR-A2.339.922 or 2.631.102).

This poses a problem because when one diode in the group fails, it causes an increase of the current in the other diodes in the group, which generally leads to an overcurrent and to the malfunctioning of the entire group of diodes, which goes out.

2

Thus, a black out effect occurs.

To eliminate this black out effect, the owner of the French patent application (FR-A-2.631.102) reports that it suffices to interlace the diodes of one group with the diodes of another group but does not disclose either the means or the method for solving this problem.

The larger the number of diodes, the more complex this problem is.

Another problem with sea buoys is that it is necessary to implant daylight markers above the signalling device.

In the known solutions, these daylight markers are borne by supports which, being supported from underneath the signalling device, frame this device and partially baffle it.

Because of the design of the light sources used, the supports are mounted to the signalling device externally, since the center of this device is taken up by the lamps and the optics.

This impairs the visibility of the light source.

One of the results that the invention seeks to obtain is a signalling device of the above-mentioned type which eliminates the above-mentioned drawbacks.

SUMMARY OF THE INVENTION

To this end, the subject of the invention is a light signalling device of this type which is visible from 3600, comprising:

- a cylindrical support rotating on a vertical axis on which groups of a predetermined number (N) of electroluminescent diodes electrically connected in series are held in place mechanically, which groups are interlaced with one another in order to reduce the black out effect when one of them fails,
- an electric power generator which supplies each group of diodes through an electric power supply circuit, which supply circuit comprises a main supply line and a secondary supply circuit having, for each diode, a connection area comprising a pair of electric connection points, at right angles to which areas the diodes are located, which device is characterized in that:
  the connection areas for each group of diodes electrically connected in series are:
  - on the one hand, separated from one another by a predetermined distance, called a reference distance, and
  - on the other hand, aligned along axes, known as series supply lines, which lines are parallel to one another and inclined relative to the vertical axis of the cylindrical support, these series supply lines are grouped in series of at least M lines, with M being at least equal to two, in a series of M series supply lines, the connection areas of a line are offset relative to the immediately adjacent lines in the same series by a value substantially equal to the ratio of the reference distance divided by the number M of lines in the series.

BRIEF DESCRIPTION OF THE DRAWINGS

The invention may be properly understood with the aid of the following description, given as a non-limiting example in reference to the appended drawings, which schematically represent.

DESCRIPTION OF THE PREFERRED EMBODIMENT

Figure 2:
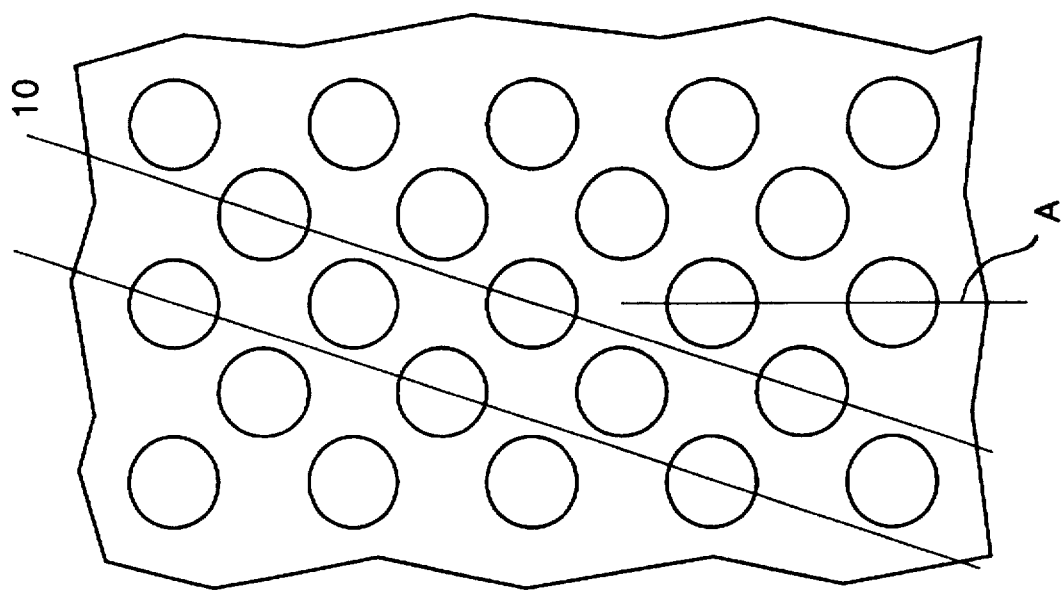
FIG. 2: a partial view of the implantation of the electroluminescent diodes.
Figure 1:
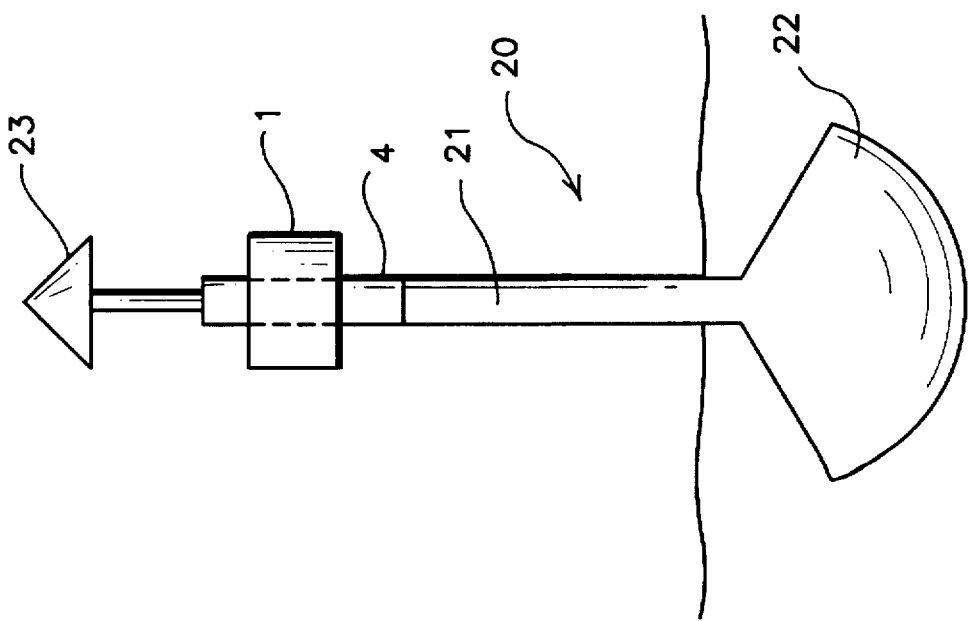
FIG. 1: a view of a buoy.
Figure 3:
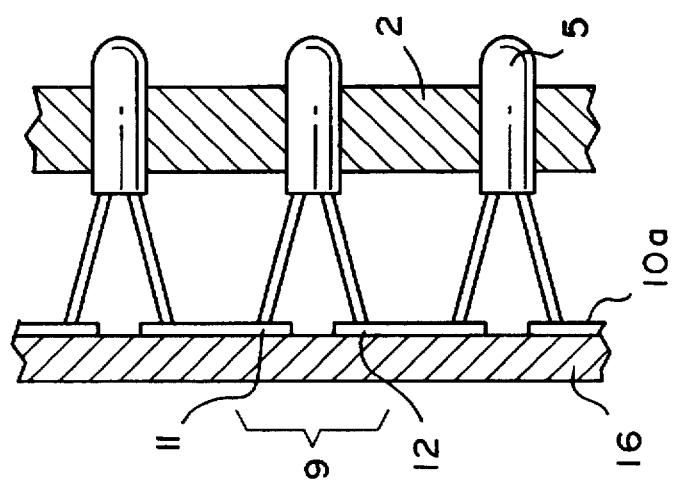
FIG. 3: a partial sectional view of a signalling device
Figure 4:
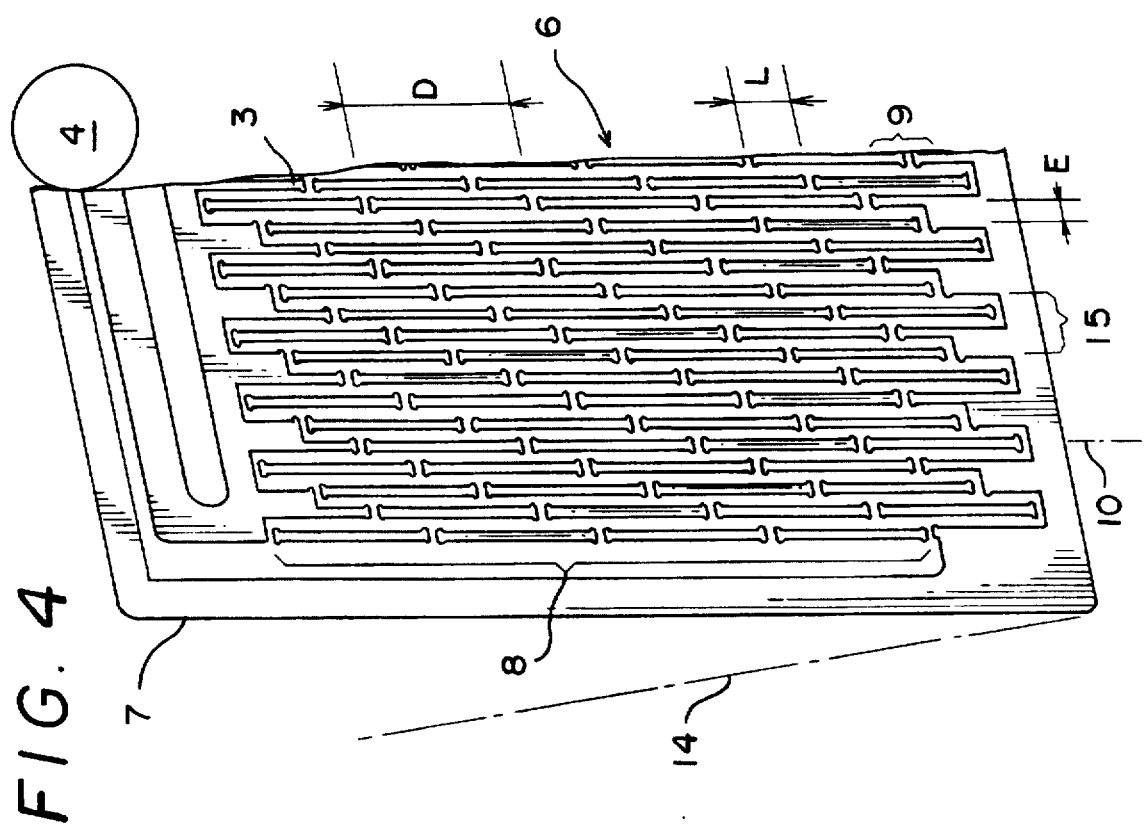
FIG. 4: a plan view of the power supply circuit.

Referring to the drawings, a light signalling device 1 visible from 360° may be seen, which signalling device comprises:

a cylindrical support 2 rotating on a vertical axis on which groups 3 of a predetermined number (N) of electroluminescent diodes electrically connected in series are held in place by any known means or method of attachment, which groups 3 are interlaced with one another in order to reduce the black out effect when one of them fails, an electric power generator 4 which supplies each group 3 of diodes 5 through an electric supply circuit, which supply circuit 6 comprises a main supply line 7 and a secondary supply circuit 8 which have, for each diode 5, a connection area 9 comprising a pair of electric connection points 11, 12, at right angles to which areas the diodes are located.

According to an essential characteristic of the invention:

the connection areas 9 of each group 3 of diodes 5 electrically connected in series are:

on the one hand, separated from one another by a predetermined distance D, called the reference distance, and on the other hand, aligned along axes, known as series supply lines 10, which lines are parallel to one another and inclined relative to the vertical axis 14 of the cylindrical support, these series supply lines are grouped in series 15 of at least M lines, with M being at least equal to two, in a series of M series supply lines, the connection areas 9 of a line 10 are offset relative to the immediately adjacent lines in the same series by a value L substantially equal to the ratio of the reference distance D divided by the number M of lines in the series.

According to the invention, the distance D between the connection areas, the space E between the parallel series supply lines and the inclination of these lines are chosen so as to produce a vertical alignment A of certain connection areas, which connection areas with the alignment in question all belong to independent series supply lines 10.

Because the support is cylindrical, the series supply lines are portions of a helix.

Thus, when the diodes carried by one series supply line fail, the black holes caused by this failure are distributed both along the vertical axis and the horizontal axis of the support, which minimizes black out effects since any burnt-out diode is surrounded by lit diodes, except for the end diodes.

In one embodiment of the invention, lines in the same series 15 will be electrically connected in parallel.

According to the invention, at least the series supply lines 10 are constituted by a layer 10a of electrically conductive material deposited on a layer 16 of dielectric substrate like a printed circuit.

According to the invention, the layer 16 of dielectric substrate is flexible.

This makes it possible to embody the power supply to the diodes in the form of a printed circuit in which the geography for the implantation of the connection areas is extremely simple to embody and to adapt, both as a function of the number of diodes supplied by a series supply line and of the number of these supply lines.

This type of supply circuit is much more reliable than the traditional hardwired circuits.

The electroluminescent diodes and their power supply circuit are housed within a volume defined by a cylindrical ring.

This allows the embodiment of an annular light signalling device which retains a substantial internal volume, making it possible, for example, to house the means for controlling the diodes within it.

Preferably, these control means are housed outside the cylindrical support so as to leave the internal volume free.

In the case of a sea buoy 20 comprising a mast 21 which, supported by the float 22, carries the signalling device 1 on top of it and markers 23, known as daylight markers, above the latter, the annular design of the light source makes it possible to eliminate the external supports for the daylight markers which previously would have surrounded the light source and partially baffled it, by replacing them with the end of the mast, which is above the device and which runs through it.

The signalling device surrounds the mast.

I claim:

1. A signalling device (1) visible from 360°, comprising:

a light source composed of several electroluminescent diodes, a cylindrical support (2) rotating on a vertical axis on which groups (3) of a predetermined number (N) of electroluminescent diodes electrically connected in series are held in place by attachment means, which groups (3) are interlaced with one another in order to reduce the black-out effect when one of them fails, an electric power generator (4) which supplies each group (3) of diodes (5) through an electric power supply circuit, which supply circuit (6) comprises a main supply line (7) and a secondary supply circuit (8) having, for each diode (5) a connection area (9) comprising a pair of electric connection points (11, 12), at right angles to which areas the diodes are located, this device being characterized in that:

the connection areas (9) of each group (3) of diodes (5) electrically connected in series are:

on one hand, separated from one another by a predetermined distance (D), called the reference distance, and on the other hand, aligned along axes, known as series supply lines (10), which lines are parallel to one another and inclined relative to the vertical axis (14) of the cylindrical support, these series supply lines are grouped in series (15) of at least M lines, with M being at least equal to two, in a series of M series supply lines, the connection areas (9) of a line (10) are offset relative to the immediately adjacent lines in the same series by a value (L) substantially equal to the ratio of the reference distance (D) divided by the number (M) of lines in the series.

2. The device according to claim 1, characterized in that the distance (D) between the connection areas, the space (E) between the parallel series supply lines and the inclination of said lines are chosen so as to produce a vertical alignment of certain connection areas, which connection areas with the alignment in question all belong to independent series supply lines.

3. The device according to claim 2, characterized in that lines in the same series (15) are electrically connected in parallel.

4. The device according to claim 1, characterized in that at least the series supply lines (10) are constituted by a layer (10a) of electrically conductive material deposited on a layer (16) of dielectric substrate comprising a printed circuit.

5. The device according to claim 4, characterized in that the layer (16) of dielectric substrate is flexible.

6. The device according to claim 1, characterized in that the electroluminescent diodes and their power supply circuit are housed within a volume defined by a rotating cylindrical ring.

7. A signalling device according to claim 1, wherein said device further comprises a sea buoy having a mast supported by a float, said light source, said cylindrical support and said electric power generator being secured to said sea buoy, and further comprising daylight markers secured above said light source.

8. A signalling device according to claim 7, wherein said signalling device surrounds said mast.

* * * * *